United States Patent
Chen

(10) Patent No.: US 7,656,662 B2
(45) Date of Patent: Feb. 2, 2010

(54) DUAL SLIDING PORTABLE ELECTRONIC DEVICE

(75) Inventor: Ping-Chou Chen, Tainan Hsien (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 127 days.

(21) Appl. No.: 11/933,923

(22) Filed: Nov. 1, 2007

(65) Prior Publication Data

US 2008/0186663 A1  Aug. 7, 2008

(30) Foreign Application Priority Data

Feb. 2, 2007  (CN) .................... 2007 1 0073194

(51) Int. Cl.
*G06F 1/16* (2006.01)
(52) U.S. Cl. ................ 361/679.55; 455/575.4
(58) Field of Classification Search .............. 361/679.3, 361/679.55, 679.56; D14/345, 341, 315
See application file for complete search history.

(56) References Cited

U.S. PATENT DOCUMENTS

| | | | |
|---|---|---|---|
| D563,936 S * | 3/2008 | Kim et al. ............. D14/138 AD |
| 7,422,436 B2 * | 9/2008 | Lee ............................ 439/10 |
| 2006/0046796 A1 * | 3/2006 | Park et al. ............... 455/575.4 |
| 2006/0209505 A1 * | 9/2006 | Kim .......................... 361/683 |
| 2007/0097607 A1 * | 5/2007 | Lee ............................ 361/679 |
| 2007/0142101 A1 * | 6/2007 | Seshagiri et al. ......... 455/575.4 |
| 2007/0153452 A1 * | 7/2007 | Harmon et al. ............. 361/679 |
| 2008/0051161 A1 * | 2/2008 | Tashiro .................... 455/575.1 |

* cited by examiner

*Primary Examiner*—Lisa Lea-Edmonds
(74) *Attorney, Agent, or Firm*—Steven M. Reiss

(57) ABSTRACT

A dual sliding portable electronic device (100) includes a main body (20), a sliding body (10) and a dual sliding assembly (30). The main body includes a first key array (231), a second key array (232), and a third key array (233) disposed on a top surface (21). The sliding body includes an upper surface (11), a display (13) disposed on the upper surface, and a bottom surface (12) at an opposite side of the upper surface. The dual sliding assembly slidingly connects the bottom surface of sliding body to the top surface of the main body, and is configured to direct the sliding body to slide along a first direction to reveal both of the second key array and the third key array, and along a second direction perpendicular to the first direction to reveal both of the first key array and the second key array.

11 Claims, 7 Drawing Sheets

DUAL SLIDING PORTABLE ELECTRONIC DEVICE

BACKGROUND

1. Technical Field

The present invention generally relates to sliding portable electronic devices and, particularly, to a dual sliding portable electronic device.

2. Description of the Related Art

In general, a portable electronic device is an electronic device that allows users to communicate with each other via wireless network. Portable electronic devices such as mobile phones, PDAs, and handheld computers are designed for the sake of portability, which have the tendency of being compact, slim, and light. Multimedia availability also plays an important role as it is desired for the portable electronic devices to have a wide variety of functions. In particular, future portable electronic devices are likely to be introduced with greater multi-function and multi-purpose utilization abilities, as well as being more compact, and capable of accessing various multimedia applications or Internet applications. Additionally, such portable electronic devices are now commonly used throughout the world, and many users described it as an indispensable device to have.

Most of the present portable electronic devices are configured with a standard alphanumeric keypad that includes alphabetic key arrangements overlaying or coinciding with the numeric keys. A user uses the standard alphanumeric keypad to input phone numbers or text messages. For example, the user can perform text entry on a standard alphanumeric keypad by pressing the numeric keys numerous times to obtain a desired alphanumeric character. However, pressing numeric keys numerous times for a specific character increase the amount of time necessary to compose a text message, thus makes it inconvenient for the user to use/operate.

In order to resolve the aforesaid problems, portable electronic device with a full QWERTY keyboard is provided. The full QWERTY keyboard is a keypad with a layout similar to a typical typewriter-style keyboard, and arranged mostly on an upper surface of the portable electronic devices, adjacent a display of the portable electronic device. However, volumes of portable electronic devices with a full QWERTY keyboard can increase in such arrangement, thereby affecting the portability of the portable electronic devices.

Therefore, what is needed is an improved portable electronic device to overcome the above-described shortcomings.

SUMMARY

In one aspect, a dual sliding portable electronic device is provided. The dual sliding portable electronic device includes a main body, a sliding body and a dual slide assembly. The main body includes a first key array, a second key array, and a third key array disposed on a top surface. The sliding body includes an upper surface, a display disposed on the upper surface, and a bottom surface at an opposite side of the upper surface. The dual sliding assembly slidingly connects the bottom surface of sliding body to the top surface of the main body, and is configured to direct the sliding body to slide along a first direction to reveal both of the second key array and the third key array, and along a second direction perpendicular to the first direction to reveal both of the first key array and the second key array.

Other advantages and novel features will become more apparent from the following detailed description when taken in conjunction with the accompanying drawings.

BRIEF DESCRIPTION OF THE DRAWINGS

Many aspects of the present dual sliding portable electronic device can be better understood with reference to the following drawings. The components in the drawings are not necessarily drawn to scale, the emphasis instead being placed upon clearly illustrating the principles of the dual sliding portable electronic device. Moreover, in the drawings, like reference numerals designate corresponding parts throughout the several views.

DETAILED DESCRIPTION OF THE PREFERRED EMBODIMENT

Figure 1:
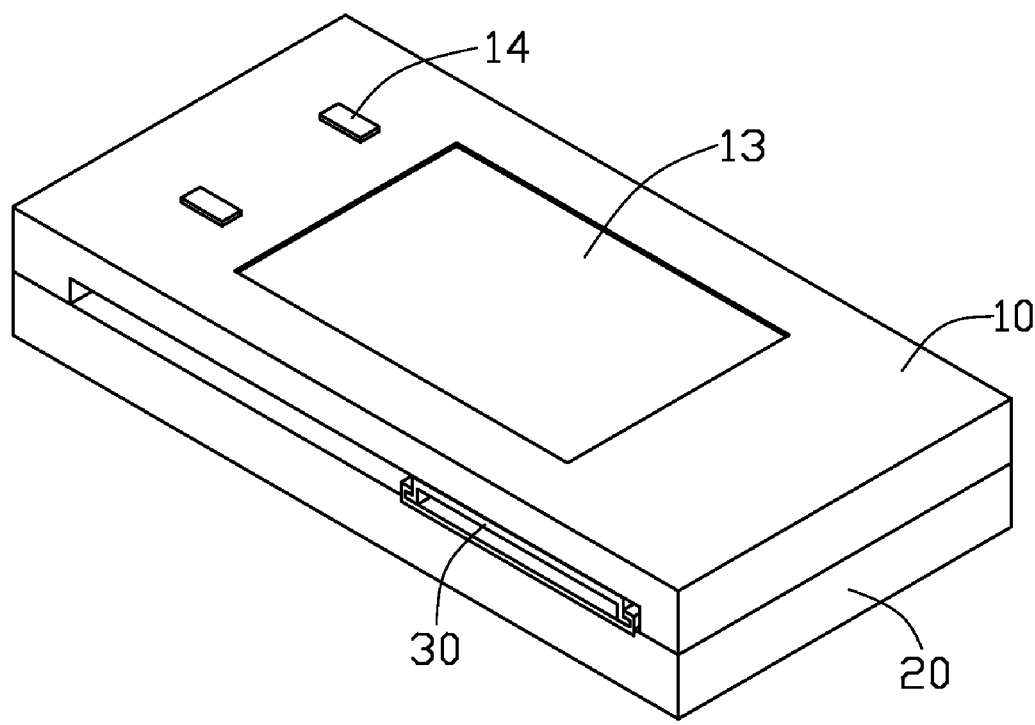
FIG. 1 is a schematic, perspective view of a dual sliding portable electronic device according to a present embodiment, wherein the portable electronic device is in a closed status.

Referring now to the drawings in detail, FIG. 1 schematically shows a dual sliding portable electronic device 100 such as mobile phones, PDAs, handheld computers and so on in accordance with a preferred embodiment. The portable electronic device 100 includes a sliding body 10, a main body 20, and a dual sliding assembly 30 connecting the sliding body 10 with the main body 20.

Figure 2:
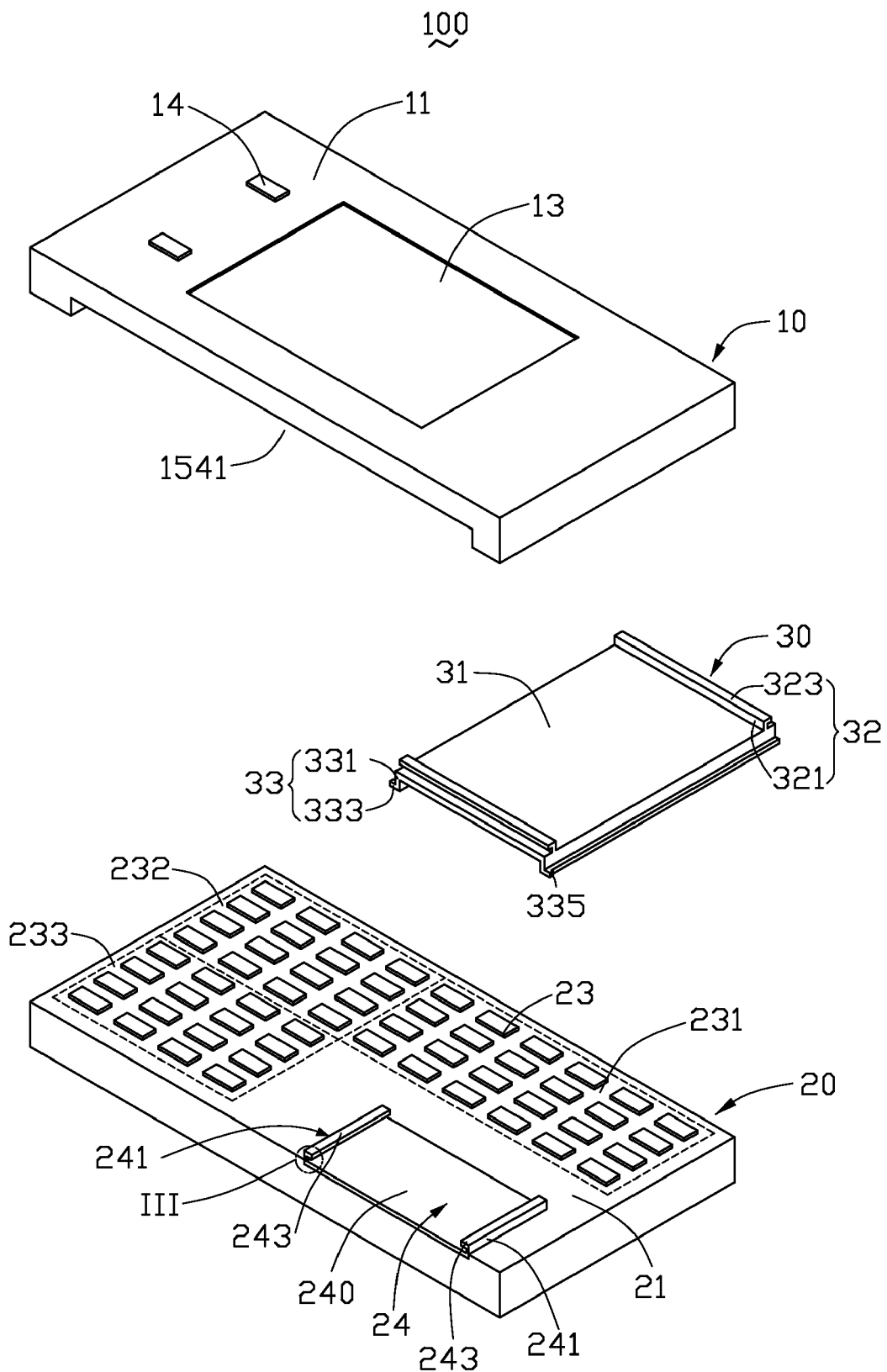
FIG. 2 shows a disassembled view of the dual sliding portable electronic device of FIG. 1.

As shown in FIG. 2, the sliding body 10 mainly includes an upper surface 11, a bottom surface 12 (shown in FIG. 4) at an opposite side of the upper surface 11, a cavity 15 (shown in FIG. 4), and a first guiding module (not labeled).

The upper surface 11 is provided with a display screen 13 and at least one function button 14. The display screen 13 and the at least one function button 14 are disposed along a first direction which is lengthwise along a longitudinal direction of the sliding body 10.

Figure 4:
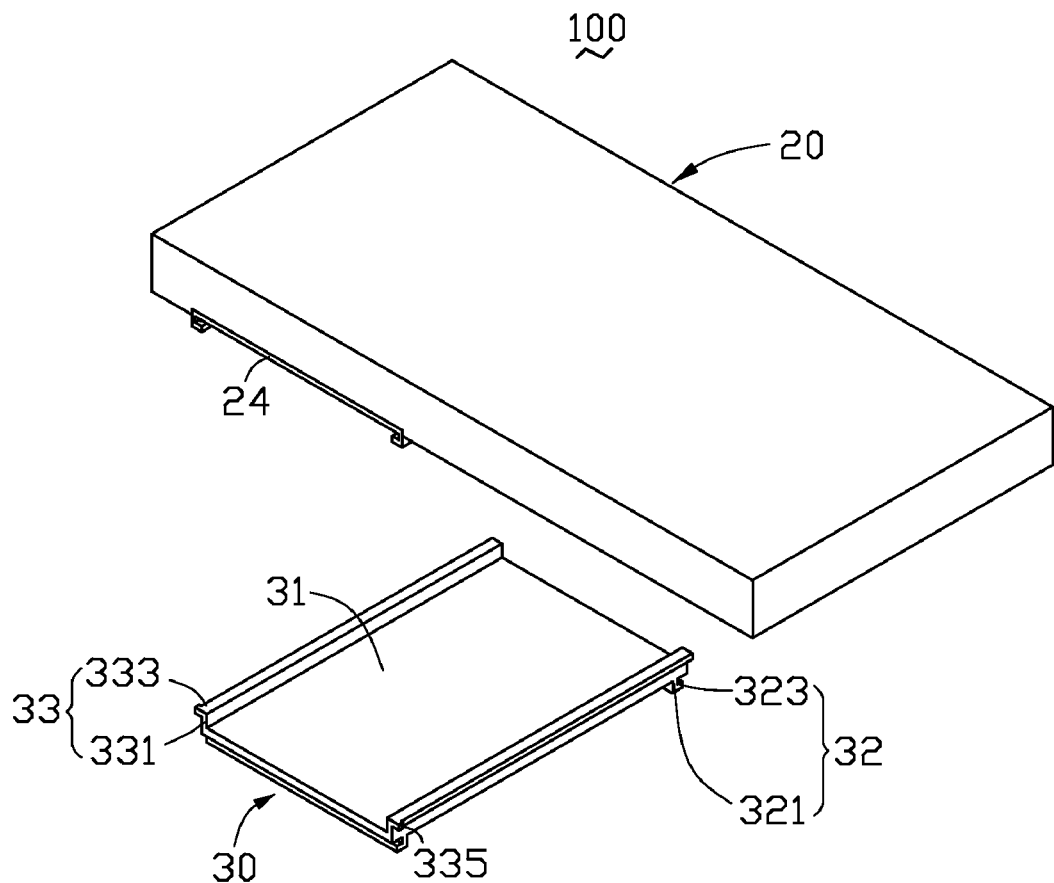
FIG. 4 is similar to FIG. 2, but viewed from another aspect.
Figure 4:
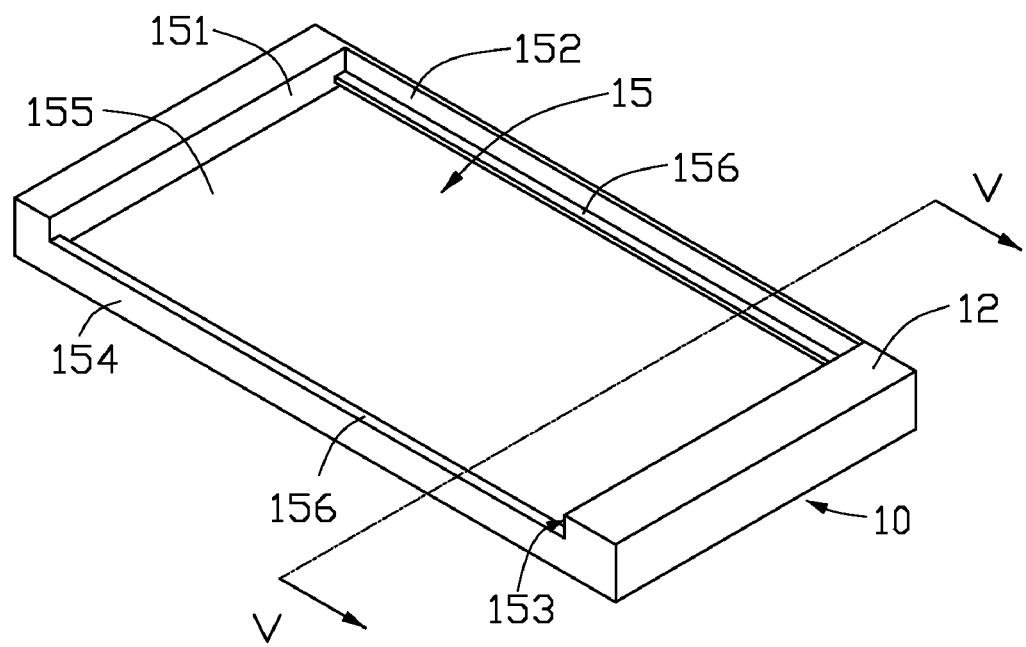
Figure 5:
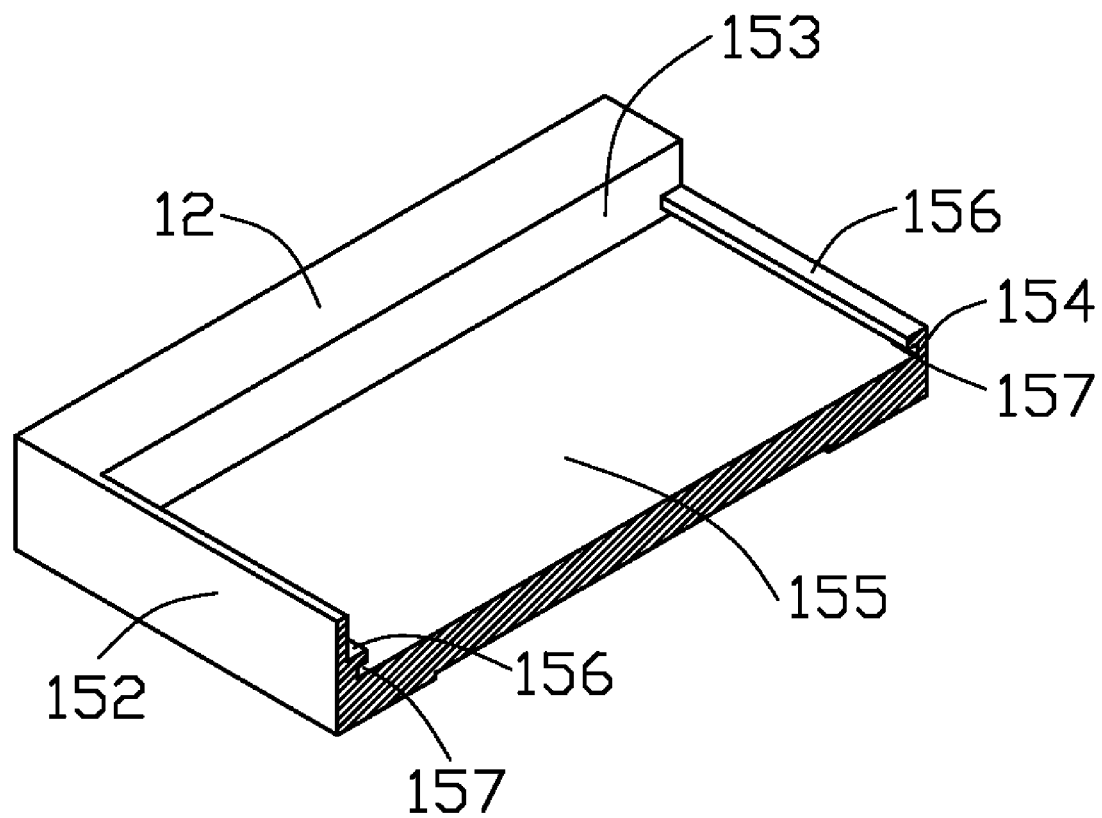
FIG. 5 shows a cross-sectional view taken along line V-V of FIG. 4.

Referring to FIG. 4, the cavity 15 is recessed/depressed from the bottom surface 12, thereby forming a pair of longitudinal sidewalls 152, 154 extending along the first direction, a pair of lateral sidewalls 151, 153 extending along a second direction which is widthwise along a transverse direction and perpendicular to the lengthwise direction, and a bottom floor 155. The sidewalls 151, 152, 153, 154 and the bottom floor 155 cooperatively defined the cavity 15 therebetween. The longitudinal sidewall 154 is lower than the lateral sidewalls 151, 153, thereby defining an opening 1541 (shown in FIG. 2) therein.

The first guide module includes a pair of guiding rails 156 configured for directing the sliding body 10 to longitudinally move along the first direction relatively to the main body 20. The guiding rails 156 respectively protrude inward from an inner side of the corresponding longitudinal sidewalls 152, 154, extending longitudinally, and spacing apart from the bottom floor 155. Therefore, a pair of guiding slots 157 is formed between the corresponding guide rails 155 and the bottom floor 155.

Also referring to FIG. 2, the main body 20 includes a top surface 21, a keyboard 23, and a second guiding module 24. The top surface 21 is configured (i.e. structured and arranged) to cooperate to the bottom surface 12 of the sliding body 10. The keyboard 23 and the second guide module 24 are both arranged on the top surface 21.

The keyboard 23 includes a first key array 231, a second key array 232, and a third key array 233. The first key array 231 and the second key array 232 are longitudinally disposed along the first direction, the second key array 232 and the third key array 233 are laterally disposed along the second direction. In the preferred embodiment, the first key array 231 and the second key array 232 both include keys each labeled with a letter being a component of an alphabet, and cooperatively form a full QWERTY keyboard. The second key array 232 further includes a standard numerical key arrangement which at least includes numerals 0-9, and symbols * and #, overlaying or coinciding with the keys labeled with a letter of the alphabet. The third key array 233 can be a directional keypad. In other embodiments, the keys of the second key array 232 are labeled only with letters of the alphabet, and the third key array 233 is configured to as a standard alphanumeric keypad.

Figure 3:
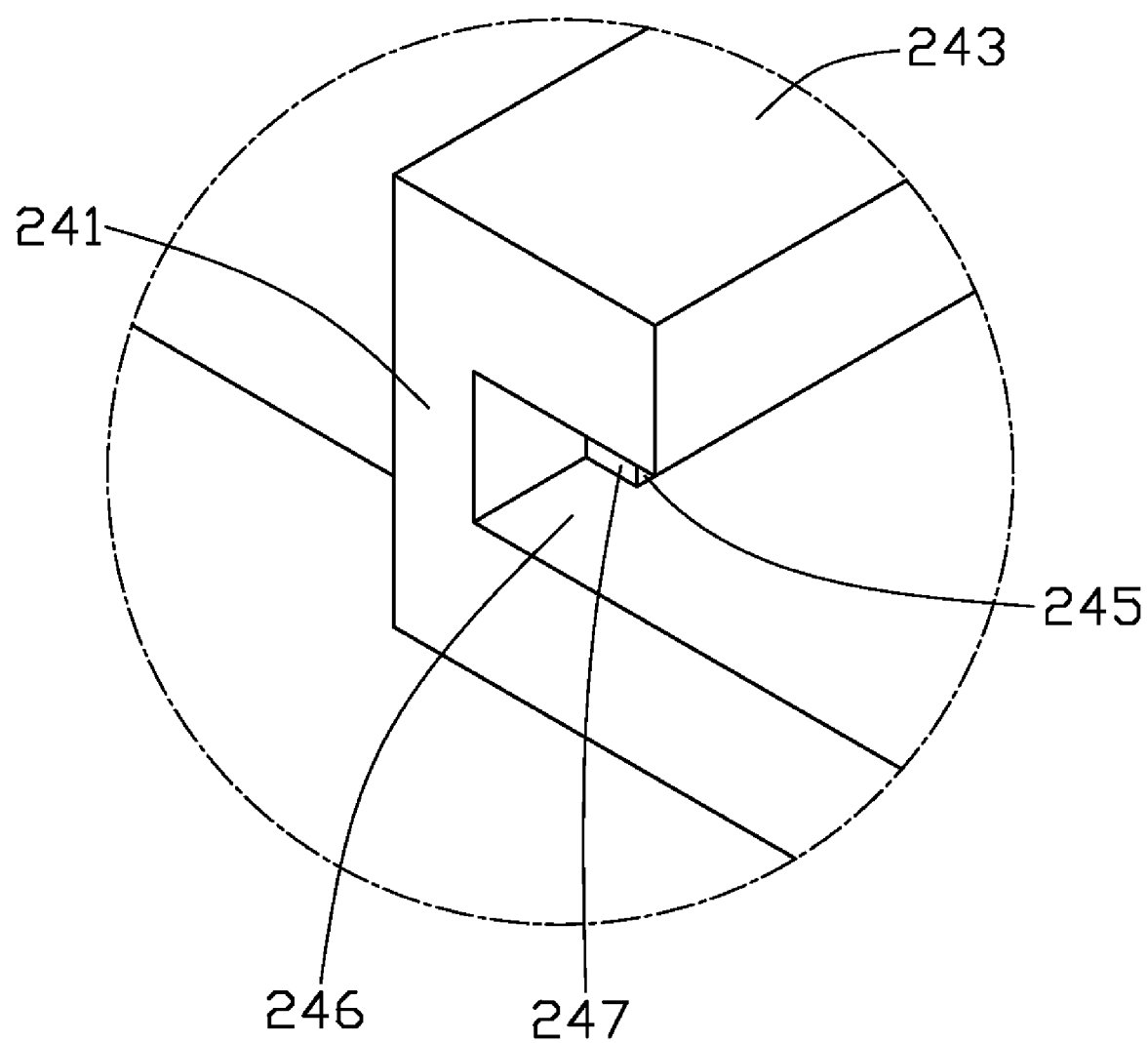
FIG. 3 is an enlarged perspective view showing area III of FIG. 2.

The second guiding module 24 is mounted on the top surface 21, and is disposed laterally with the first key array 231 and longitudinally with the third key array 233. The second guiding module 24 is configured to direct the sliding body 10 to laterally move along the second direction relatively to the main body 20, and includes a base plate 240, a pair of side plates 241, and a pair of guiding bars 243. The base plate 240 is secured to the top surface 21. The side plates 241 project perpendicularly from two opposite sides of the base plate 240, and laterally extend along the second direction. The pair of guiding bars 243 respectively protrudes inward from a corresponding inner side of the side plates 241. Thus, a pair of guiding grooves 245 (shown in FIG. 3) is formed between the corresponding guiding bars 243 and the base plate 240. Also referring to FIG. 3, each side plate 241 has a cave 246 and a block side 247 defined therein. Each cave 246 is recessed from a distal end portion of an inner surface of each side plate 241, and positioned at the end in a distance form the keyboard 23. The block side 247 is perpendicular to the inner surface of the side plates 241.

As shown in FIGS. 2 and 4, the dual sliding assembly 30 primarily includes a base board 31, a first directing portion 32 configured to cooperate with the first guide module, and a second directing portion 33 configured to cooperate with the second guide module 24. The base board 31 is generally a rectangular plate member, and has a top side, a bottom side positioned opposite to the top side, and four peripheral ends connecting with the top side and the bottom side. The first portion 32 includes a pair of side plates 321 and a pair of directing rails 323. The side plates 321 are disposed at the two opposite peripheral ends of the base board 31, and project perpendicularly from the top side of the base board 31. The pair of directing rails 323 bends outward from a corresponding distal end of the side plates 321. The second slide portion 33 includes a pair of side plates 331, and a pair of directing bars 333. The side plates 331 is disposed at the other two opposite peripheral ends of the base board 31, and project perpendicularly from a bottom side of the base board 31, extending along an opposite direction to the first side plates 321. The pair of directing bars 333 bends outward from a corresponding distal end of the side plates 331. Each directing bar 333 has a block protrusion 335 bent outward along the first direction from a distal end. The blocking protrusions 335 are configured for engaging in the caves 246 of the second guiding module 24.

In assembly, firstly, the dual slide assembly 30 is mounted to the main body 20. The directing bars 333 of the second directing portion 33 respectively engage in the guiding grooves 245 of the second guiding module 24. The blocking protrusions 335 can be received in the caves 246 of the side plates 241, and abut against the blocking sides 247 in order to prevent the sliding body 10 and the dual slide member 30 from sliding towards the key array 231. The sliding body 10 is then mounted to the dual slide assembly 30. The directing rails 323 of the first slide portion 32 are slidingly coupled with the guiding slots 157 of the first slide module.

Referring to FIG. 1, the portable electronic device 100 is set in a closed status, wherein the sliding body 10 substantially overlaps the main body 20. The blocking protrusions 335 are respectively received in the caves 246 of the side plates 241, and abut against the blocking sides 247, in order to prevent the sliding body 10 and the dual slide member 30 from sliding towards the key array 231. At this status, a user can use the at least one function button 14 to perform simple operations such as receiving an incoming call, reading a short message and etc.

Figure 6:
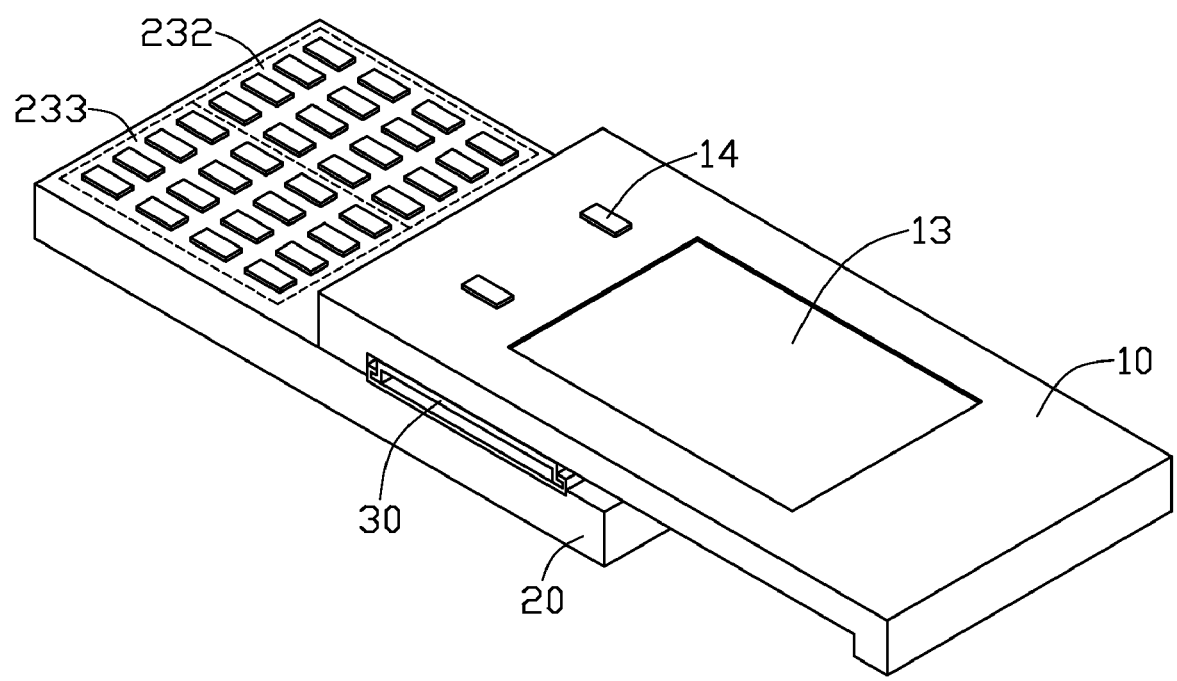
FIG. 6 is a perspective view showing the dual sliding portable electronic device of FIG. 1, wherein the portable electronic device is opened along a lengthwise direction.

Referring to FIG. 6, the sliding body 10 longitudinally moves along the first direction relative to the dual slide assembly 30 and then the main body 20 until the second guiding module 24 blocks the sidewall 153 of the sliding body 10. At this status, the second key array 232 and the third key array 233 are both revealed/exposed to the user, and the user can operate the portable electronic device 100 with the second key array 232 and the third key array 233.

Figure 7:
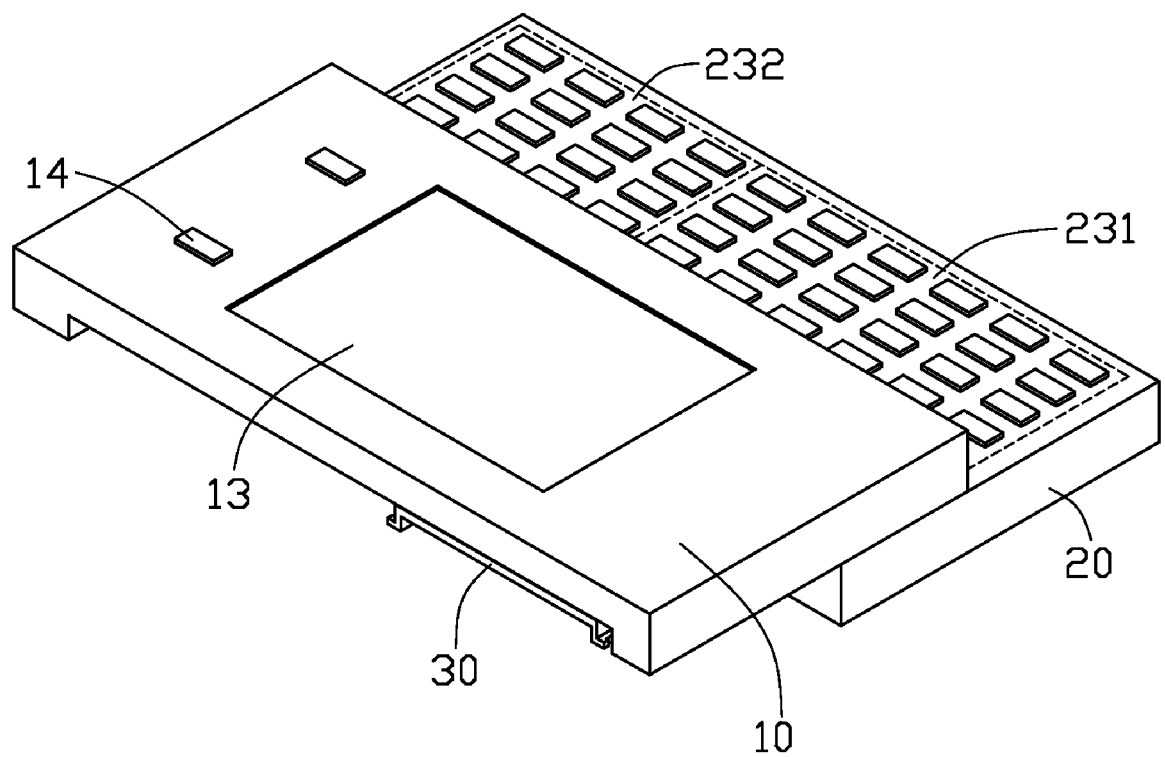
FIG. 7 is a perspective view showing the dual sliding portable electronic device of FIG. 1, wherein the portable electronic device is opened along a widthwise direction.

Referring to FIG. 7, the sliding body 10 and the dual sliding assembly 30 both laterally move along the second direction until the second guiding module 24 blocks the sidewall 152 of the sliding body 10. At this status, the first key array 231 and the second key array 232 which cooperatively form a full QWERTY keypad are revealed/exposed to the user. Thus, the user can transversely hold the portable electronic device 100 and operate the portable electronic device 100 conveniently with both hands as to play games or create text messages.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A portable electronic device comprising:
   a main body, the main body comprising a first key array, a second key array, and a third key array disposed on a top surface thereof;
   a sliding body, the sliding body comprising an upper surface having a display disposed thereon, and a bottom surface at an opposite side of the upper surface; and
   a dual sliding assembly slidingly connecting the bottom surface of the sliding body to the top surface of the main body, and comprising a pair of guiding slots defined in the bottom surface of the sliding body and a pair of directing rails slidingly engaging with the guiding slots to direct the sliding body to slide along a first direction to reveal both of the second key array and the third key array, and a pair of guiding grooves defined in the top surface of the main body and a pair of directing bars slidingly coupling with the guiding grooves to direct the sliding body to slide along a second direction perpendicular to the first direction to reveal both of the first key array and the second key array.

2. The portable electronic device as claimed in claim 1, wherein the dual sliding assembly comprises a base board, a first directing portion comprising the directing rails and disposed on an upper surface of the base board, and a second directing portion comprising the directing bars and disposed on a bottom surface of the base board.

3. The portable electronic device as claimed in claim 2, wherein the first directing portion further comprises a pair of side plates protruding from two opposite distal ends of the upper surface, and each directing rail outwardly and perpendicularly extending from a distal end of the corresponding side plate.

4. The portable electronic device as claimed in claim 3, wherein the second directing portion further comprises a pair of side plates protruding from the other two opposite distal ends of the bottom surface, and each directing bar outwardly and perpendicularly extending from a distal end of the corresponding side plate.

5. The portable electronic device as claimed in claim 4, wherein each directing bar has a block protrusion projecting from a distal end thereof.

6. The portable electronic device as claimed in claim 3, wherein the sliding body further comprises a cavity formed in the bottom surface thereof, a pair of first sidewalls extending along the first directions, a pair of second sidewalls extending along the second directions and a bottom floor cooperatively defining the cavity therebetween, the first slots being respectively defined in the first sidewalls.

7. The portable electronic device as claimed in claim 6, wherein the dual sliding assembly further comprises a pair of guiding rails inwardly protruding from the first sidewalls, and the guiding slots are respectively formed between the guiding rails and the bottom floor.

8. The portable electronic device as claimed in claim 5, wherein the dual sliding assembly further comprises a base plate mounted on the top surface of the main body, a pair of side plates perpendicularly extending from two opposite ends of the base plate along the second direction, a pair of guiding bars inwardly and perpendicularly projecting from the end of the side plates, and the guiding grooves are respectively defined between the guiding bars and the base plate.

9. The portable electronic device as claimed in claim 8, wherein each side plate further has a cave recessed in a distal end of an inner surface thereof, thereby forming a block side perpendicular to the inner surface, the caves being configured to receive the block protrusions therein with the block sides abutting against the block protrusions of the dual sliding assembly for limiting the dual sliding assembly from sliding towards the first key array.

10. The portable electronic device as claimed in claim 1, wherein the first key array and the second key array cooperatively forms a full QWERTY keyboard, and the third key array is a standard alphanumeric keypad.

11. The portable electronic device as claimed in claim 1, wherein the first key array and the second key array cooperatively form a full QWERTY keyboard, and the second key array further has a standard numerical key arrangement partly overlaying/coinciding with the full QWERTY keyboard, and the third key array is a directional keypad.

* * * * *